(12) United States Patent
Harper et al.

(10) Patent No.: US 7,402,022 B2
(45) Date of Patent: Jul. 22, 2008

(54) ROTOR BLADE CONTAINMENT ASSEMBLY FOR A GAS TURBINE ENGINE

(75) Inventors: Cedric Brett Harper, Derby (GB); Ian Graham Martindale, Derby (GB)

(73) Assignee: Rolls-Royce PLC, London (GB)

( * ) Notice: Subject to any disclaimer, the term of this patent is extended or adjusted under 35 U.S.C. 154(b) by 597 days.

(21) Appl. No.: 11/088,179

(22) Filed: Mar. 24, 2005

(65) Prior Publication Data
US 2005/0271503 A1 Dec. 8, 2005

(30) Foreign Application Priority Data
Apr. 20, 2004 (GB) .................................. 0408825.8

(51) Int. Cl.
*F01D 21/00* (2006.01)
(52) U.S. Cl. ........................................ 415/9; 415/214.1
(58) Field of Classification Search ..................... 415/9, 415/173.4, 214.1
See application file for complete search history.

(56) References Cited

U.S. PATENT DOCUMENTS

| | | | |
|---|---|---|---|
| 4,293,053 A | 10/1981 | Shuttleworth et al. | |
| 5,201,846 A | 4/1993 | Sweeney | |
| 5,267,828 A * | 12/1993 | Lenhart et al. | 415/9 |
| 5,431,532 A * | 7/1995 | Humke et al. | 415/9 |
| 5,885,056 A * | 3/1999 | Goodwin | 415/9 |
| 6,468,026 B1 | 10/2002 | Bonnoitt et al. | |
| 2005/0089391 A1 * | 4/2005 | Stretton | 415/9 |

FOREIGN PATENT DOCUMENTS

| | | |
|---|---|---|
| EP | 1 013 894 A2 | 6/2000 |
| EP | 1 087 104 A2 | 3/2001 |
| EP | 1 245 794 A2 | 10/2002 |

* cited by examiner

*Primary Examiner*—Edward Look
*Assistant Examiner*—Nathaniel Wiehe
(74) *Attorney, Agent, or Firm*—Oliff & Berridge, PLC

(57) ABSTRACT

A gas turbine engine rotor blade containment assembly (38) comprising a generally cylindrical, or frustoconical, casing (40). The casing (40) having at least one member (54) and the member (54) has a first portion (53) extending radially from the casing (40) and a second portion (55) extending axially from the first portion (53) of the member (54). At least one cassette (80) being provided and one or more liner panels (74) being arranged in each cassette (80). A first end (84) of each cassette (80) being locatable on the second portion (55) of the member (54) and the first end (84) of each cassette (80) being shaped to correspond to the shape of the first and second portions (53,55) of the at least one member (54) to protect the first and second portions (53,55) of the at least one member (54). The second end (86) of each cassette (80) having at least one axially extending member (96) removably securable to the casing (40).

15 Claims, 3 Drawing Sheets

ROTOR BLADE CONTAINMENT ASSEMBLY FOR A GAS TURBINE ENGINE

The present invention relates to a rotor blade containment assembly for a gas turbine engine, particularly to a fan blade containment assembly or a turbine blade containment assembly for a gas turbine engine.

Turbofan gas turbine engines for powering aircraft conventionally comprise a core engine, which drives a fan. The fan comprises a number of circumferentially spaced radially outwardly extending fan blades mounted on a fan rotor enclosed by a generally cylindrical, or frustoconical, fan casing. The core engine comprises one or more turbines, each one of which comprises a number of circumferentially spaced radially outwardly extending turbine blades enclosed by a cylindrical, or frustoconical, casing.

There is a remote possibility with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore, it is known to provide strong fibrous material wound around relatively thin metallic casings or around the above-mentioned containment casings. In the event that a blade becomes detached it passes through the casing and is contained by the fibrous material.

The fan casing is provided with a hook axially upstream of the tips of the fan blades to prevent upstream movement of a detached fan blade.

A fan blade track liner is provided within the fan casing around and adjacent the tips of the fan blades.

Conventionally the fan blade track liner is secured within the fan casing by adhesive bonding.

Our UK patent application 0324549.5 filed 22 October describes an arrangement where one or more fan blade track liner panels are arranged in a cassette and the cassette has an axially extending member locatable on the hook. The cassette comprises for example a composite material. The cassette merely holds the fan blade track liner panels on and adjacent the fan casing. In the event that a fan blade becomes detached it passes through the cassette and is contained by the casing.

Accordingly the present invention seeks to provide a novel gas turbine engine rotor blade containment assembly.

Accordingly the present invention provides a gas turbine engine rotor blade containment assembly comprising a generally cylindrical, or frustoconical, casing, the casing having at least one member, the at least one member having a first portion extending radially from the casing and a second portion extending axially from the first portion of the at least one member, at least one cassette, one or more liner panels being arranged in the at least one cassette, a first end of the at least one cassette being locatable on the second portion of the at least one member, the first end of the at least one cassette being shaped to correspond to the shape of the first and second portions of the at least one member to protect the first and second portions of the at least one member, the second end of the at least one cassette having at least one axially extending member removably securable to the casing.

Preferably there is a plurality of cassettes.

Preferably one or more liner panels being arranged in each cassette, a first end of each cassette being locatable on the second portion of the member, the first end of each cassette being shaped to correspond to the shape of the first and second portions of the at least one member to protect the first and second portions of the at least one member, the second end of each cassette having at least one axially extending member removably securable to the casing.

Preferably the cassettes are arranged circumferentially around and within the casing.

Preferably the cassettes have axially extending edges, the axially extending edges of adjacent cassettes overlap.

The axially extending edge of one of the adjacent cassettes may have a tongue and the axially extending edge of the other of the adjacent cassettes may have a groove.

Preferably the first end of the at lest one cassette is U-shape or C-shape in cross-section.

Preferably the at least one member is annular.

Preferably the casing comprises a metal, more preferably the casing comprises titanium, aluminium, an aluminium alloy, a titanium alloy, magnesium or magnesium alloy.

Preferably the at least one cassette comprises a metal, more preferably the at least one cassette comprises steel, titanium or a titanium alloy.

Preferably the at least one axially extending member of the at least one cassette being removably securable to the casing by at least one retention member, the at least one retention member being removably securable to the casing.

Preferably the casing is a fan casing and the rotor blades are fan blades. The casing may be a compressor casing and the rotor blade may be compressor blades. The casing may be a turbine casing and the rotor blades may be turbine blades.

The present invention will be more fully described by way of example with reference to the accompanying drawings in which.

Figure 1:
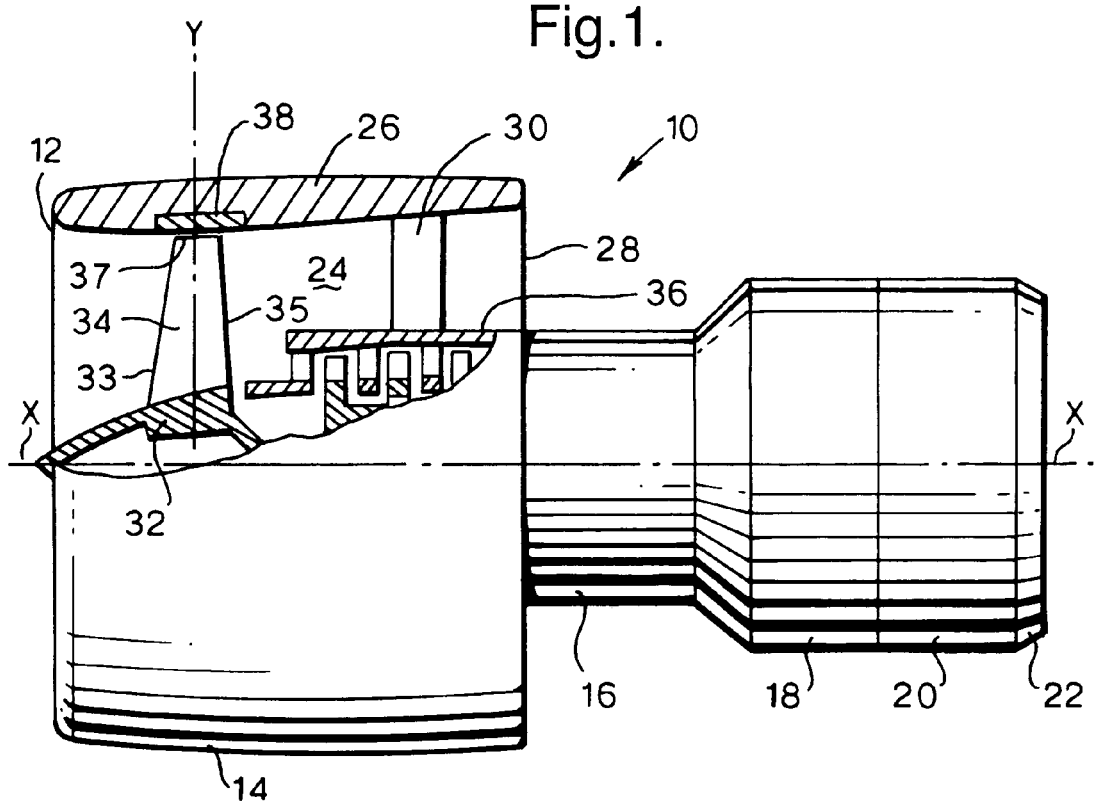
FIG. 1 is a partially cut away view of a gas turbine engine having a fan blade containment assembly according to the present invention.

A turbofan gas turbine engine 10, as shown in FIG. 1, comprises in axial flow series and intake 12, a fan section 14, a compressor section 16, a combustor section 18, a turbine section 20 and an exhaust 22. The turbine section 22 comprises one or more turbines (not shown) arranged to drive one or more compressors (not shown) in the compressor section 16 via shafts (not shown). The turbine section 20 also comprises one or more turbines (not shown) arranged to drive the fan section 14 via a shaft. The fan section 14 comprises a fan duct 24 defined partially by a fan casing 26. The fan duct 24 has an outlet 28 at its axially downstream end. The fan casing 26 is secured to a core engine casing 36 by a plurality of circumferentially spaced radially extending fan outlet guide vanes 30. The fan casing 26 surrounds a fan rotor 32, which carries a plurality of circumferentially spaced radially outwardly extending fan blades 34. The fan rotor 32 and fan blades 34 rotate about an axis X of the gas turbine engine 10, substantially in a plane Y perpendicular to the axis X. The fan casing 26 also comprises a fan blade containment assembly 38, which is arranged substantially in the plane Y of the fan blades 34. The fan blades 34 have a leading edge 33, a trailing edge 35 and a tip 37.

The fan casing 26 and fan blade containment assembly 38 is shown more clearly in FIGS. 2, 3, 4 and 5. The fan blade containment assembly 38 comprises a metal, cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 also comprises a downstream flange 44 by which the fan blade containment assembly 38 is connected to a flange 52 on a rear portion 50 of the fan casing 26. The metal casing 40 comprises an annular member, or hook, 54 positioned axially upstream of the leading edge 33 of the tip 37 of the fan blade 34. The annular member 54 is L-shaped in cross-section in planes containing the axis X of the gas turbine engine 10 and also of the metal casing 40, and the annular member 54 comprises a first portion 53 which extends in a radially inwardly direction from the metal casing 40 and a second portion 55 which extends in an axially downstream direction from the radially inner end 53A of the first portion 53 of the annular member 54 towards the tip 37 of the fan blade 34. The annular member 54 is substantially in a plane W, perpendicular to the axis X of the gas turbine engine 10, upstream of the most upstream point of the leading edge 33 of the fan blade 34.

A liner 60 is provided radially within the metal casing 40 and there are two types of liner 60, an acoustic liner 62 to reduce noise and a fan blade track liner 64 to form an abradable seal.

The acoustic liner 62 generally comprises a plurality of acoustic panels 66, which are arranged circumferentially and axially along the inner surface 40A of the metal casing 40. Each acoustic panel 66 comprises a perforated skin 68 and a structure 70 to form an acoustic treatment structure. The perforated skin 68 has a plurality of perforations 72. The perforated skin 68 defines the flow path through the fan duct 24.

The perforated skin 68 of each acoustic panel 66 comprises aluminium, titanium or composite material, for example fibre reinforced plastic e.g. glass fibre reinforced epoxy resin. The structure 70 comprises a honeycomb structure, for example an aluminium honeycomb, a titanium honeycomb, a composite material honeycomb, a resin impregnated paper honeycomb or other suitable honeycomb. The composite material honeycomb may comprise fibre reinforced plastic e.g. glass fibre reinforced epoxy resin.

The fan blade track liner 64 generally comprises a plurality of fan blade track panels 74 which are arranged circumferentially and axially along the inner surface 40A of the metal casing 40. Each fan blade track panel 74 comprises a skin 76 and a structure 78 to form an abradable structure. The skin 76 defines the flow path through the fan duct 24.

The skin 76 of each fan blade track panel 64 comprises for example a Nomex (RTM) aramid fibre paper honeycomb structure filled with abradable filler. The abradable filler comprises for example hollow microspheres in an epoxy paste. However, other suitable honeycombs and abradable fillers may be used. The structure 78 comprises a honeycomb structure, for example an aluminium honeycomb, a titanium honeycomb, a composite material honeycomb, a resin impregnated paper honeycomb or other suitable honeycomb. The composite material honeycomb may comprise fibre reinforced plastic e.g. glass fibre reinforced epoxy resin.

The acoustic panels 66 are secured to the metal casing 40 by suitable means known in the art for example adhesive bonding, fasteners etc.

The fan blade track panels 74 are secured to a plurality of cassettes 80 by adhesive bonding, for example each cassette 80 has one or more fan blade track panels 74. Each cassette 80 comprises an open ended and open sided box structure 82 and in particular the box structure comprises a base portion 88, an upstream end 84 and a downstream end 86. The base portion 88 has edges 90 and 92 extending axially between the upstream end 84 and the downstream end 86 of the cassette 80. The cassettes 80 are arranged circumferentially within the metal casing 40 around the fan blades 34 substantially in the plane Y. The base portion 88 is shaped to conform to the shape of inner surface 40A of the metal casing 40.

Each cassette 80 is formed from metal, for example steel, and is preferably formed from steel with high strength characteristics. But other suitable metals, for example titanium or a titanium alloy may be used. Alternatively each cassette 80 may comprise a ceramic material.

The upstream end 84 of each cassette 80 is arranged to extend radially inwardly from the base portion 88 and then in an axially downstream direction such that it is L-shaped, hook-shaped, in cross-section in planes containing the axis X of the gas turbine engine 10 and also of the metal casing 40, to form a continuous channel 94 with the base portion 88. The channel 94 is open at its downstream end and faces towards the downstream end 86 of the cassette 80. In addition each cassette 80 is arranged such that the L-shaped, or hook-shaped, upstream end 84 is dimensioned and shaped to match the first portion 53 and second portion 55 of the annular L-shaped member 54. The radially inner end of the upstream end 84 of each cassette 80 is radially outward of the axially extending second portion 55 of the annular member 54 and thus secures the upstream end 84 of each cassette 80 to the metal casing 40. The upstream end 84 of each cassette 80 is locatable on the second portion 55 of the annular L-shaped member 54. During a fan blade off event, the upstream end 84 of each cassette 80 protects the annular L-shaped member 54 when the tip of a detached fan blade 34 moves in an upstream direction axially along the metal casing 40, and protects the annular L-shaped member 54 from being cut off the metal casing 40 by the detached fan blade 34.

Figure 5:
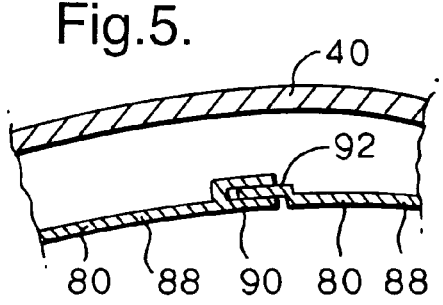
FIG. 5 is an alternative cross-section along line A-A through the fan blade containment assembly shown in FIG. 2.
Figure 4:
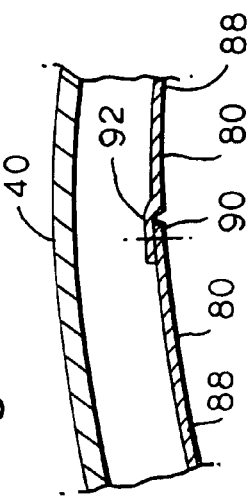
FIG. 4 is a cross-section along line A-A through the fan blade containment assembly shown in FIG. 2.

The adjacent edges 90 and 92 of the cassettes 80 are arranged to overlap, either as a lap, as shown in FIG. 4, or as a tongue and groove, as shown in FIG. 5. The overlapping of the adjacent edges 90 and 92 of the base portions 88 of the cassettes 80 is arranged such that during a fan blade off event, the tip 37 of a rotating fan blade 34 rides along the overlap instead of engaging the ends 90 and 92.

A compliant layer, for example polysulphide, may be provided between the cassettes 80 and the metal casing 40 to reduce fretting between the cassettes 80 and the metal casing 40.

Figure 3:
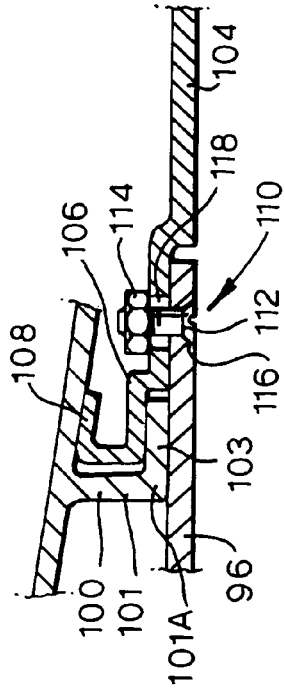
FIG. 3 shows a further enlarged cross-sectional view of part of the fan blade containment assembly shown in FIG. 2.

The metal casing 40 has a second annular member, or hook, 100, as shown more clearly in FIG. 3. The second annular member 100 is L-shaped in cross-section in planes containing the axis X of the gas turbine engine 10 and also of the metal casing 40 and comprises a first portion 101 which extends in a radially inwardly direction from the metal casing 40 and a second portion 103 which extends in an axially downstream direction from the radially inner end 101A of the first portion 101 of the second annular member 100. A number of part annular retention members 104, for example two half annular members, are provided to retain the downstream ends 86 of the cassettes 80 on the metal casing 40. Preferably each retention member 104 is formed from metal, for example steel, and is preferably formed from steel with high strength characteristics. But other suitable metals, for example titanium or a titanium alloy may be used. The upstream end 106 of each retention member 104 has a hook 108 which is arranged to locate radially outwardly of the second portion 103 of the second annular member 100 on the metal casing 40. The hook 108 is preferably U-shaped, or C-shaped, in cross-section in planes containing the axis X of the gas turbine engine 10 and also of the metal casing 40. The axially extending edges of the adjacent retention members 104 are also arranged to overlap, as a lap, similarly to FIG. 4 and the edges of the adjacent retention members 104 are secured together, by fasteners, e.g. bolts, or screws, and nuts or rivets.

The downstream end 86 of each cassette 80 has an axially extending member 96 to secure the cassettes 80 to the metal casing 40. The axially extending member 96 at the downstream end 86 of each cassette 80 is secured to one of the retention members 104 by fastening means 110, for example one or more radially extending screws 112 and anchor nuts 114, extending through countersunk apertures 116 in the axially extending member 96 of the cassettes 80 and apertures 118 in the retention members 104. In addition the radially outer surface of the axially extending member 96 of each cassette 80 abuts the second portion 103 of the second annular member 100.

The fan blade track panels 74 are installed by firstly adhesively bonding the fan blade track panels 74 to the cassettes 80. The retention members 104 are installed by moving them in an axially upstream direction so that the upstream ends 106 of the retention members 104 locate on the radially outer surface of the second portion 103 of the second annular member 100. The edges of the retention members 104 are arranged to overlap and then the edges are secured together, for example by fasteners, e.g. bolts, or screws, and nuts or rivets. The cassettes 80 are installed by moving them in an axially upstream direction so that the upstream ends 84 of the cassettes 80 locate on the radially outer surface of the second portion 55 of the annular member 54. The cassettes 80 are then moved radially outwardly to abut the radially inner surface 40A of the metal casing 40 and so that the axially extending members 96 abut the second portions 103 of the annular members 100 and the retention members 104. Then the screws, or bolts, 112 are inserted through the apertures 116 and 118 in the axially extending members 96 and the retention members 104 and threaded into the anchor nuts 114. The apertures 118 are preferably slots, e.g. axially elongate in an axial direction, to protect the fasteners from shearing in the event of fan blade 34 becoming detached.

The fan track liner panels 74 are removed by unfastening the screws, or bolts, 112 from the anchor nuts 114 and removing the screws 112. The cassettes 80 are removed by moving them in an axially downstream direction so that the upstream ends 84 no longer locate on the radially outer surface of the second portion 55 of the annular member 54. If one or more of the fan blade track panels 74 are damaged a new cassette 80 with fan blade track panels 74 adhesively bonded to the cassette 80 is installed.

The downstream end of the skin 76 may comprise high-density filler for ice impact protection.

The advantage of the present invention is that the cassette comprises a metal and the cassette helps contain a fan blade in the event of a fan blade becoming detached. In particular the upstream ends of the cassettes are shaped to match the annular member on the metal casing and the upstream ends of the cassettes form an annulus and thus protect the annular member of the metal casing in the event of a fan blade becoming detached. The use of the cassette enables the annular member on the metal casing to be made thinner and also enables the metal casing to be made thinner. In addition the metal casing may be made from lower strength material, for example aluminium. The retention members protect the metal casing during fan blade root impact. The upstream ends of the retention members may protect the second annular member on the metal casing. The reduction in thickness of the metal casing and/or the lower strength metal enables the weight of the metal casing to be reduced. Alternatively, the cassettes may be used in conjunction with a metal casing to provide improved fan blade containment capability. Thus the cassettes comprise relatively high strength materials, eg high strength metals, and are used to protect relatively low strength materials, eg low strength metals, casings and annular members to reduce weight. Alternatively the cassettes of relatively high strength materials, rg high strength metals are used to protect relatively high strength material, eg high strength metals, casings and annular members to improve fan blade containment capability.

Figure 6:
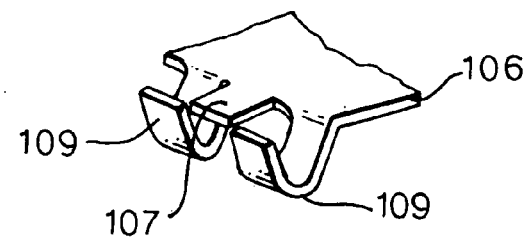
FIG. 6 is a further enlarged perspective view of an alternative part of the fan blade containment assembly shown n FIG. 2.
Figure 2:
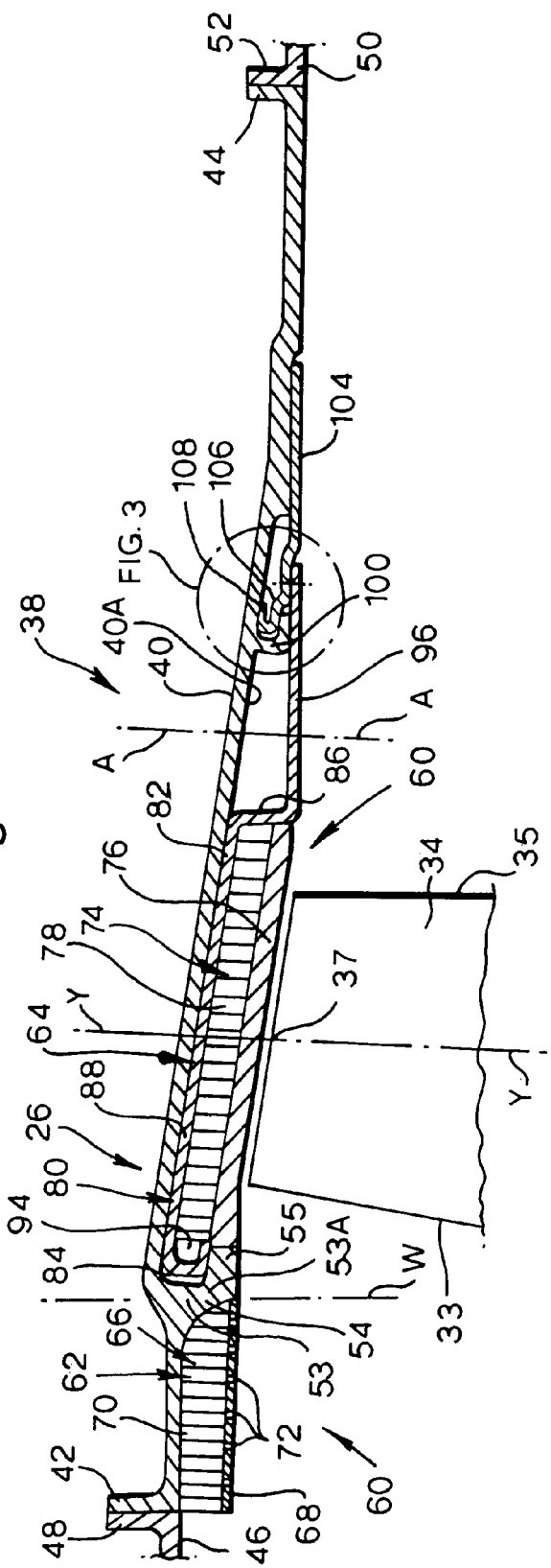
FIG. 2 is an enlarged cross-sectional view of the fan blade containment assembly shown in FIG. 1.

FIG. 6 shows an alternative arrangement for the upstream end 106 of a retention member 104. In this arrangement the upstream end 106 comprises at least one axially extending tang 107 and a number of bent tangs 109. The bent tangs 109 are firstly bent radially outwardly and then bent radially inwardly. These tangs 107 and 109 hold the retention members 104 on the second annular member 100. In this arrangement the upstream end 106 of the retention member 104 may not provide as good a protection for the second annular member 100.

Figure 7:
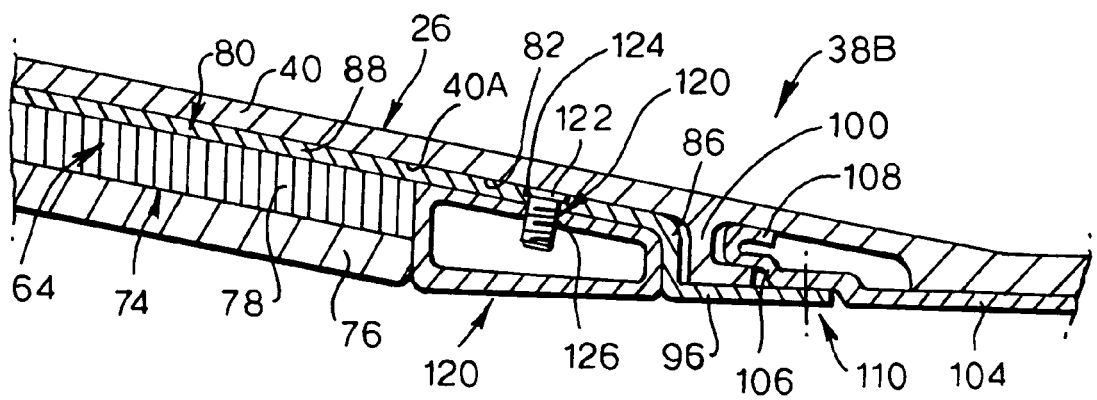
FIG. 7 is an alternative enlarged cross-sectional view of the fan blade containment assembly shown in FIG. 1.

FIG. 7 shows an alternative fan blade containment assembly 38B, which is similar to that shown in FIGS. 2 to 5 and like parts are denoted by like numerals. This embodiment differs in that at least one ice impact panel 120 is secured in each cassette 80, axially downstream of the fan blade track liner panels 74. Each ice impact panel 120 is secured to the base portion 88 of the respective cassette 80 by fastening means 120, for example one or more radially extending screws 122 extending through countersunk apertures 124 in the base portion 88 of the cassettes 80 and threaded apertures 126 in the ice impact panel. Alternatively each ice impact panel 120 may be secured to the base portion 88 of the respective cassette 80 by adhesive bonding or each ice impact panel 120 may be secured to the base portion of the respective cassette 80 by a combination of screws and adhesive bonding. The ice impact panels 120 comprise a graphite reinforced plastic box, which may be filled with high-density filler, for example an epoxy paste filler.

Figure 8:
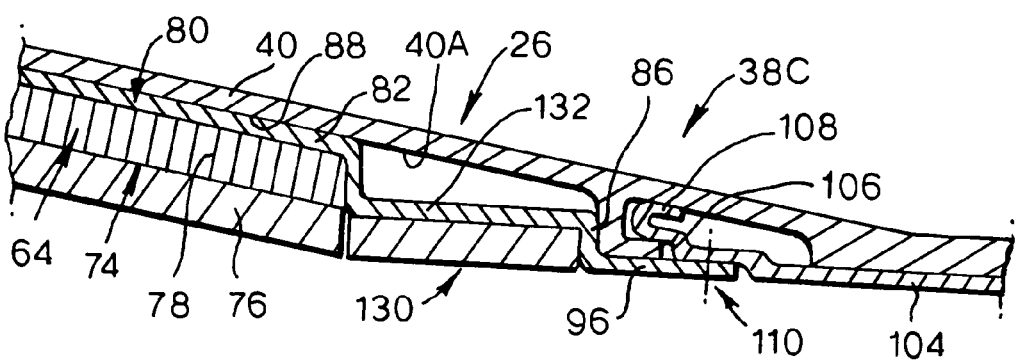
FIG. 8 is another alternative enlarged cross-sectional view of the fan blade containment assembly shown in FIG. 1.

FIG. 8 shows an alternative fan blade containment assembly 38C, which is similar to that shown in FIGS. 2 to 5 and like parts are denoted by like numerals. This embodiment differs in that at least one ice impact panel 130 is secured in each cassette 80, axially downstream of the fan blade track liner panels 74. Each ice impact panel 130 is secured to the base portion 88 of the respective cassette 80 by adhesive bonding. The ice impact panels 130 comprise an abradable liner filled with high-density filler, for example an epoxy paste filler. In this embodiment the base portion 88 of each cassette 80 has a stepped portion 132 axially upstream of the downstream end 86 of the cassette 80 and the ice impact panel 130 is secured to the stepped portion 132 of the base portion 88 of the cassette 80. The stepped portion 132 is arranged radially inwardly of the base portion 88 and radially outwardly of the axially extending member 96.

Figure 9:
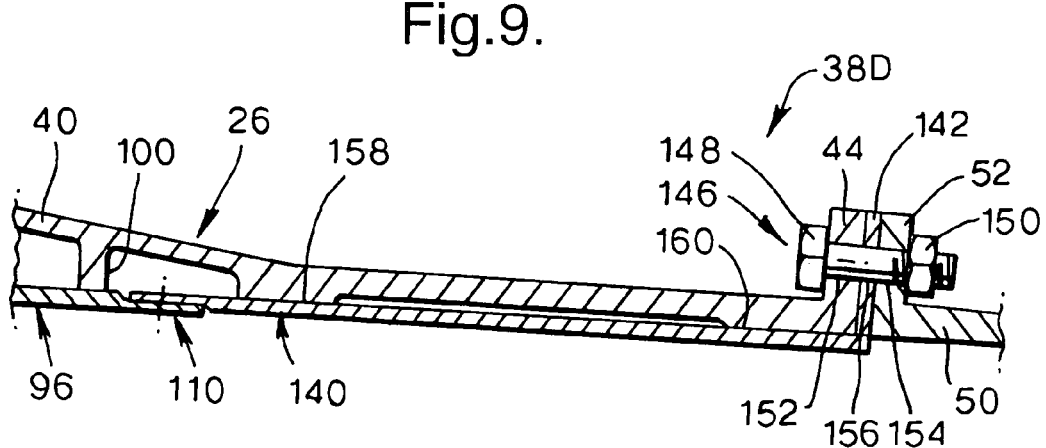
FIG. 9 is another alternative enlarged cross-sectional view of the fan blade containment assembly shown in FIG. 1.

FIG. 9 shows an alternative fan blade containment assembly 38D, which is similar to that shown in FIGS. 2 to 5 and like parts are denoted by like numerals. This embodiment differs in that a single cylindrical annular retention member 140 is provided rather than a number of part annular members. The axially downstream end of the annular retention member 140 has a radially extending flange 142, which is securable between the downstream flange 44 at the downstream end of the metal casing 40 and the flange 52 at the upstream end of the rear portion 50 of the fan casing 26 by fastening means 146. The fastening means 146 comprises a number of bolts 148 which extend through aligned apertures 152, 154 and 156 in the downstream flange 44, the flange 52 and the flange 142 and corresponding nuts 150. The annular retention member 140 locates on inner cylindrical surfaces 158 and 160 on the inner surface 40A of the metal casing 40. The axially extending members 96 at the downstream ends of the cassettes 80 are secured to the upstream end of the annular retention member 140 in the same manner as previously, e.g. using screws and anchor nuts. The second annular member 100 only comprises a first portion 101 which extends in a radially inwardly direction from the metal casing 40.

Preferably the casing comprises a metal, more preferably the casing comprises titanium, aluminium, an aluminium alloy, a titanium alloy, magnesium or magnesium alloy. Alternatively the casing comprises a composite material comprising reinforcing fibres in a matrix material. The composite material may for example comprise an organic matrix composite or a metal matrix composite. For example carbon fibres, or glass fibres, in a resin matrix, eg epoxy or silicon carbide fibres, or silicon nitride fibres, in an aluminium matrix.

It may be possible to provide a strong fibrous material wound around the metal casing.

Although the present invention has been described with reference to a fan casing and fan blades the invention may be applicable to a compressor casing and the compressor blades or to a turbine casing and turbine blades.

We claim:

1. A gas turbine engine rotor blade containment assembly comprising:
   a generally cylindrical, or frustoconical, casing, the casing having an axis and at least one integral member, the at least one integral member having a first portion extending radially from the casing and a second portion extending axially from the first portion of the at least one integral member; and
   at least one cassette comprising an upstream end, a base portion and a downstream end, the upstream end of the at least one cassette being arranged to extend radially inwardly from the base portion and in an axially downstream direction, the base portion of the at least one cassette being arranged to abut the inner surface of the casing,
   one or more liner panels being arranged in the at least one cassette,
   the upstream end of the at least one cassette being locatable on the second portion of the at least one integral member,
   the upstream end of the at least one cassette being shaped to correspond to the shape of the first and second portions of the at least one integral member to protect the first and second portions of the at least one integral member, and
   the downstream end of the at least one cassette having at least one axially extending member removably securable to the casing.

2. A gas turbine engine rotor blade containment assembly as claimed in claim 1, wherein there is a plurality of cassettes.

3. A gas turbine engine rotor blade containment assembly as claimed in claim 2, wherein the cassettes are arranged circumferentially around and within the casing.

4. A gas turbine engine rotor blade containment assembly as claimed in claim 2, wherein the cassettes have axially extending edges, and the axially extending edges of adjacent cassettes overlap.

5. A gas turbine engine rotor blade containment assembly as claimed in claim 4, wherein an axially extending edge of one of the adjacent cassettes has a tongue and an axially extending edge of another of the adjacent cassettes has a groove.

6. A gas turbine engine rotor blade containment assembly as claimed in claim 1, wherein the upstream end of the at least one cassette is U-shape, or C-shape, in cross-section in planes containing the axis of the casing.

7. A gas turbine engine rotor blade containment assembly as claimed in claim 1, wherein the at least one integral member is annular.

8. A gas turbine engine rotor blade containment assembly as claimed in claim 1, wherein the casing comprises a metal.

9. A gas turbine engine rotor blade containment assembly as claimed in claim 8, wherein the casing comprises one of titanium, aluminium, an aluminium alloy, a titanium alloy, magnesium and magnesium alloy.

10. A gas turbine engine rotor blade containment assembly as claimed in claim 1, wherein the at least one cassette comprises a metal.

11. A gas turbine engine rotor blade containment assembly as claimed in claim 10, wherein the at least one cassette comprises one of steel, titanium and a titanium alloy.

12. A gas turbine engine rotor blade containment assembly as claimed in claim 1, wherein the at least one axially extending member of the at least one cassette being removably securable to the casing by at least one retention member, the at least one retention member being removably securable to the casing.

13. A gas turbine engine rotor blade containment assembly as claimed in claim 1, wherein the casing is a fan casing and rotor blades of the containment assembly are fan blades.

14. A gas turbine engine rotor blade containment assembly comprising:
   a generally cylindrical, or frustoconical, casing, the casing having an axis and at least one member, the at least one member having a first portion extending radially from the casing and a second portion extending axially from the first portion of the at least one member; and
   a plurality of cassettes, each having a first end and a second end, one or more liner panels being arranged in the cassettes, the first end of the cassettes being locatable on the second portion of the at least one member, the first end of the cassettes being shaped to correspond to the shape of the first and second portions of the at least one member to protect the first and second portions of the at least one member, the second end of the cassettes having at least one axially extending member removably securable to the casing, wherein
   the cassettes have axially extending edges, and
   the axially extending edges of adjacent cassettes overlap.

15. A gas turbine engine rotor blade containment assembly comprising:
   a generally cylindrical, or frustoconical, casing, the casing having an axis and at least one member, the at least one member having a first portion extending radially from the casing and a second portion extending axially from the first portion of the at least one member; and a plurality of cassettes, each having a first end and a second end, one or more liner panels being arranged in the cassettes, the first end of the cassettes being locatable on the second portion of the at least one member, the first end of the cassettes being shaped to correspond to the shape of the first and second portions of the at least one member to protect the first and second portions of the at least one member, the second end of the cassettes having at least one axially extending member removably securable to the casing, wherein the cassettes have axially extending edges, the axially extending edges of adjacent cassettes overlap, and an axially extending edge of one of the adjacent cassettes has a tongue and an axially extending edge of another of the adjacent cassettes has a groove.

* * * * *